UNITED STATES PATENT OFFICE.

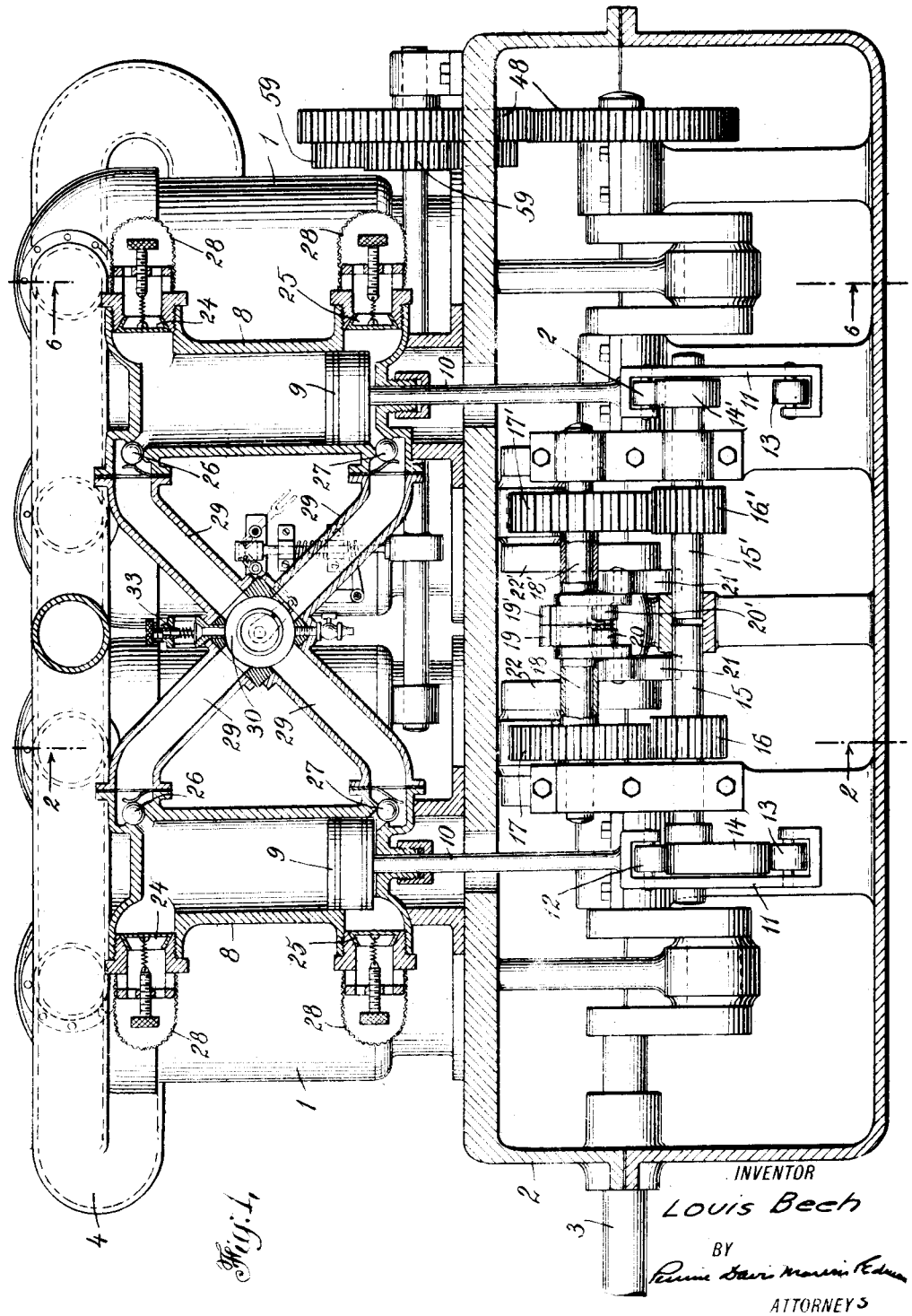

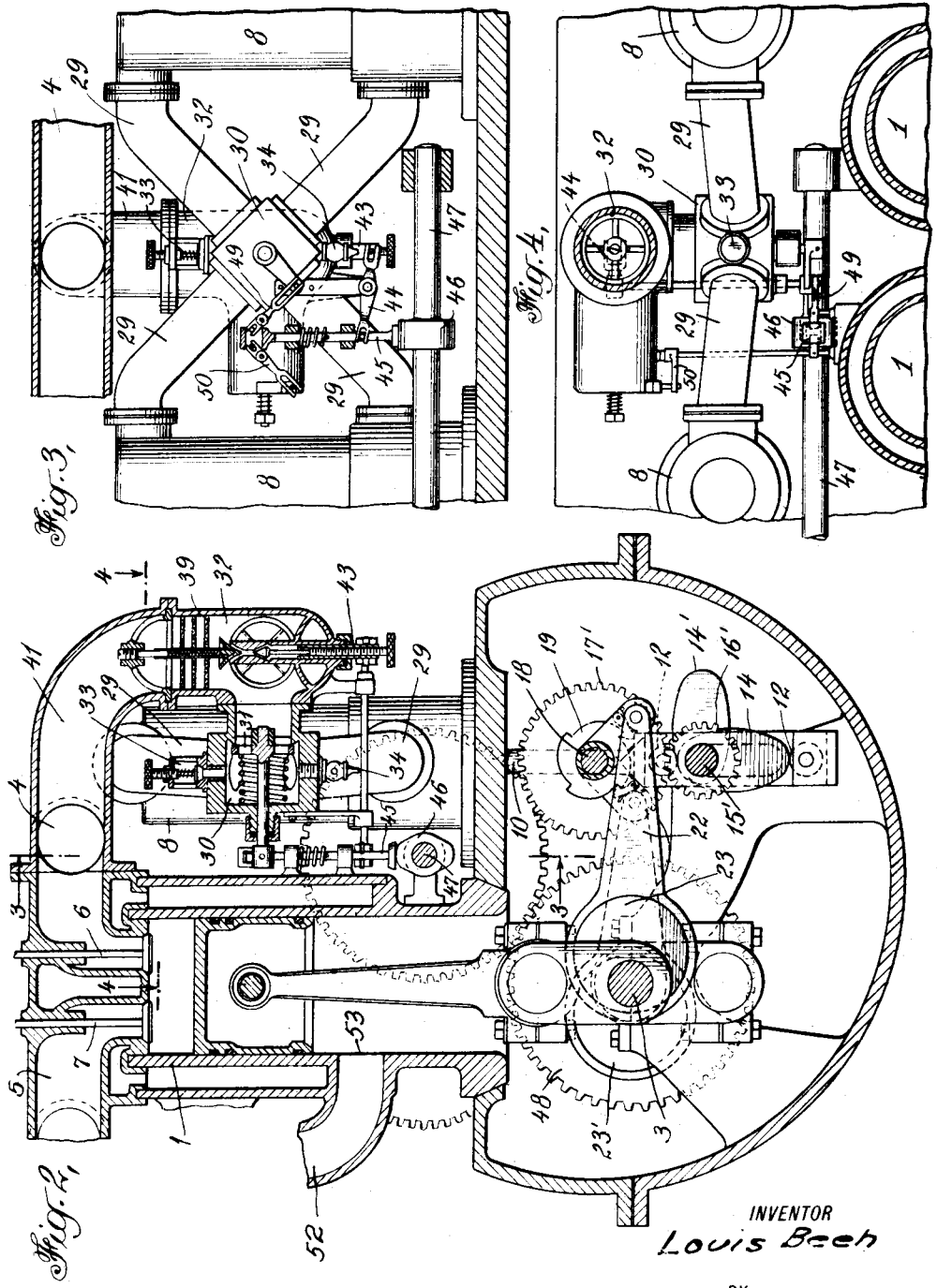

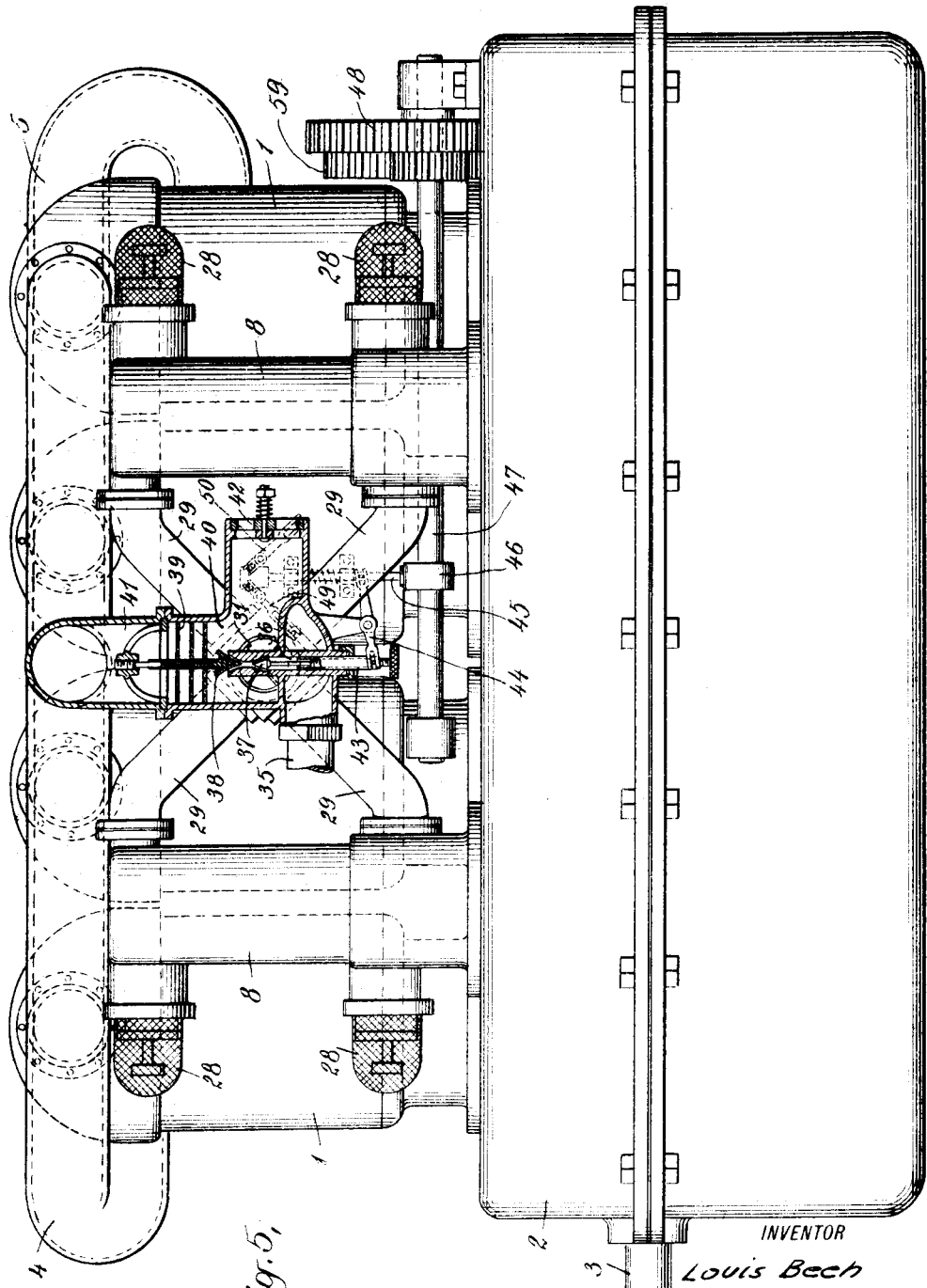

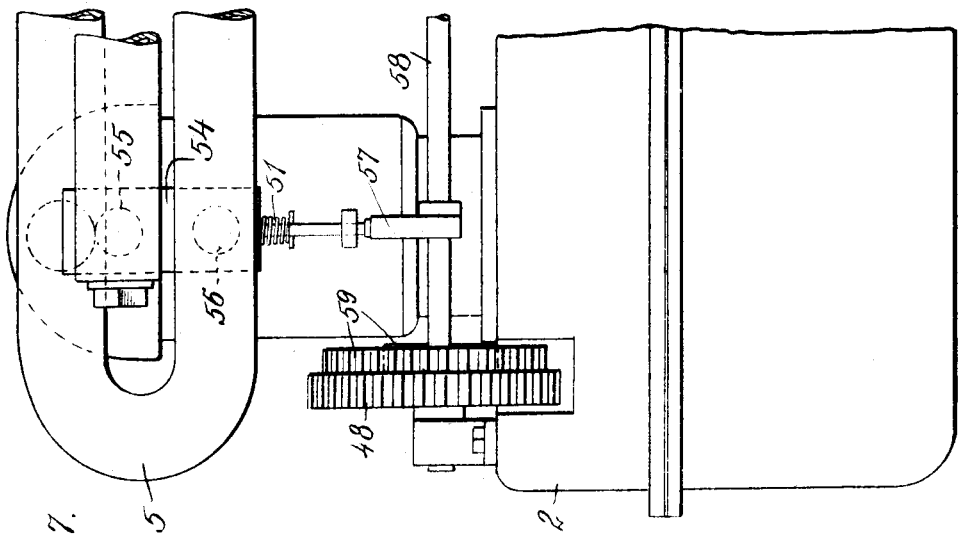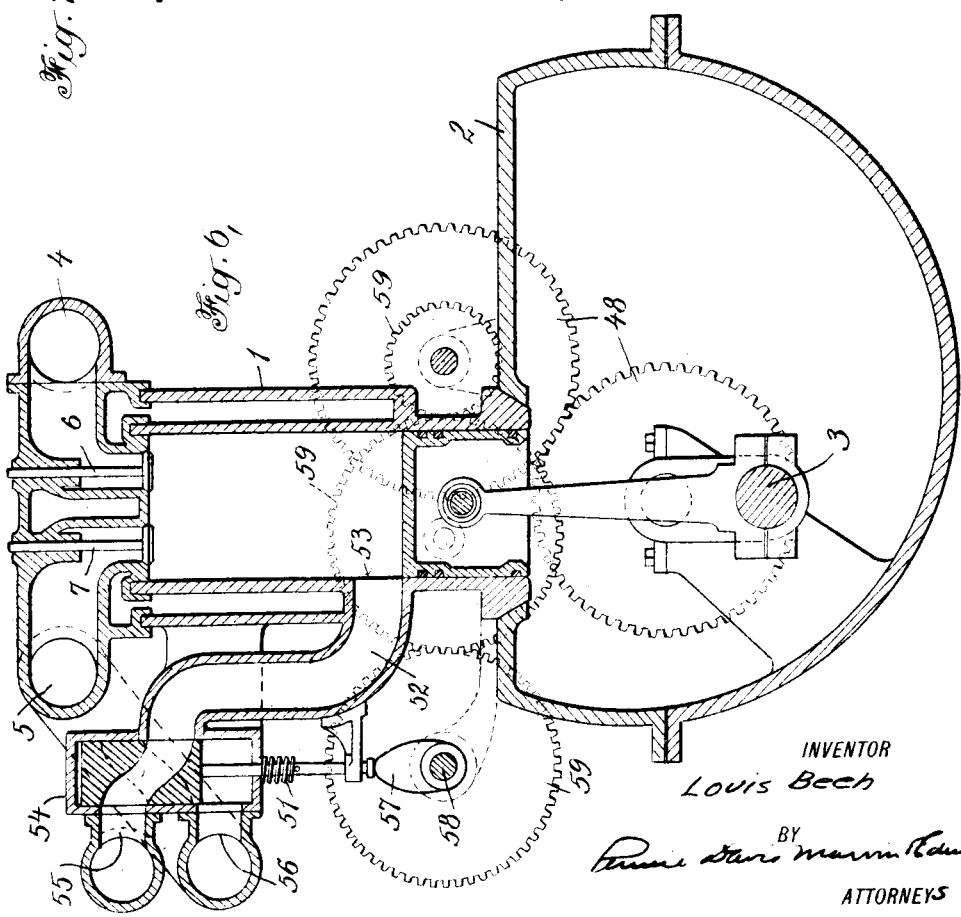

LOUIS BEEH, OF PLAINFIELD, NEW JERSEY, ASSIGNOR TO KARL P. SCHEINER, OF BROOKLYN, NEW YORK.

INTERNAL-COMBUSTION ENGINE.

1,365,811.　　　　　Specification of Letters Patent.　　Patented Jan. 18, 1921.

Application filed February 11, 1918. Serial No. 216,489.

*To all whom it may concern:*

Be it known that I, LOUIS BEEH, a subject of the Emperor of Germany, residing at Plainfield, in the county of Union and State of New Jersey, have invented certain new and useful Improvements in Internal-Combustion Engines; and I do hereby declare the following to be a full, clear, and exact description of the invention, such as will enable others skilled in the art to which it appertains to make and use the same.

The present invention relates to internal combustion engines of the two-cycle or the four-cycle type, and particularly to an engine of this kind wherein gas, comprising air or fuel or a mixture of the two, is injected under pressure into each power cylinder near the termination of the intake period thereof, to thereby complete, enrich, or supplement the gas, comprising air or fuel or a mixture, normally sucked into the cylinder in the earlier part of that period. In this way the output of each engine cylinder is increased, and, if desired, means may be provided for automatically regulating the output of the engine to maintain a substantially constant speed at variable load or to provide a range of variable speed at substantially constant load, by varying the power of the explosion or combustion occurring at each working stroke of the engine.

As a result of my invention, the pressure in the charge at the end of the compression stroke may be increased, thereby permitting the use of low grade fuels as kerosene; or for the same degree of compression the stroke of the engine may be decreased, thereby reducing the weight of the reciprocating parts. Furthermore, the ignition is made more certain with the higher compression, due to the resulting increased temperature. Also easier starting may be obtained with an engine designed in accordance with my invention.

The compressed gas which is injected near the termination of the intake period may consist of air, fuel, a suitable mixture of the two or any gas adapted to promote combustion of the fuel. This gas is injected into the cylinder, preferably through the carbureter, during a time interval of each stroke by means of pumping mechanism separate from the cylinder and independent of the working piston, and which may be driven by the engine or in any other suitable manner.

The gas supplied to the cylinder during the earlier part of the intake stroke may be suitably adjusted to vary the richness of the complete charge. If desired, the subsequent supply may be injected through the carbureter into the cylinder by way of the usual inlet valve thereof, or by way of a special valve uncovered by the piston near the outer end of the stroke of the piston therein, or through both valves. If the special valve is used for the inlet, it may also serve as a supplemental exhaust valve and thus further increase the effectiveness of the engine.

In the preferred embodiment shown hereinafter, two double acting pumps are provided for a four-cylinder, four-cycle engine, each pump injecting compressed air at each stroke through the carbureter into the intake manifold of the engine, and thence through the main and supplemental inlet valves of the proper cylinder. The pump mechanism and the valves are so timed that the injection into each cylinder occurs near the termination of the intake stroke, diluting the mixture of fuel and air previously sucked into the cylinder in the earlier part of that stroke, and raising the pressure in the cylinder at the time. The valves then close and the complete mixture in the cylinder is thereafter compressed to a value higher than usual.

In the accompanying drawings illustrating the preferred embodiment of my invention in application, as an example, to a four-cylinder, four-cycle engine, Figure 1 is an elevation of the front of the engine, a part of the pump mechanism being in section and the carbureter being omitted; Fig. 2 is a section on line 2—2 of Fig. 1, the carbureter being shown in section; Figs. 3 and 4 are sections on lines 3—3 and 4—4, respectively, of Fig. 2; Fig. 5 is a view similar to Fig. 1, showing the crank case closed instead of open and showing the carbureter in section; Fig. 6 is a section on line 6—6 of Fig. 1, and Fig. 7 is an elevation partly broken away, of the rear of the engine.

The four power cylinders 1 are mounted on a closed crank case 2 and drive the crank shaft 3. The intake manifold 4 and exhaust manifold 5 serve all the cylinders, each of which has a main inlet valve 6 and a main exhaust valve 7, both operated by well known cam mechanism (not shown).

The pump mechanism comprises two pumps having cylinders 8, pistons 9, and piston rods 10 terminating in yokes 11. Each yoke has a roller 12 at one end and a roller 13 at the other end, both coöperating with a driving cam. The driving cam 14 is displaced 90° from the driving cam 14', and the shafts 15 and 15', on which the cams are respectively mounted, carry gears 16 and 16' meshed with gears 17 and 17'. The latter gears are fast on the respective shafts 18 and 18', and are intermittently driven by the four-toothed ratchets 19 and 19'. These ratchets coöperate with spring pressed pawls 20 and 20' which are carried by the crank arms 21 and 21' pivotally connected to the eccentric rods 22 and 22'. The eccentrics 23 and 23' are fast on the crank shaft 3 of the engine at 180° displacement from each other.

Each pump cylinder has two air inlet valves 24 and 25 and two outlet valves 26 and 27. The inlet valves are screened over at 28 for filtration of dust. The outlet valves communicate with the four ducts 29 leading into a common chamber 30 provided with a flat perforated valve 31 opening into the carbureter 32. The chamber 30 has a pressure valve 33, adjustable so as to control the pressure of the gas injected into the cylinder by the pumping mechanism, and it also has a drain cock 34.

The carbureter has a fuel inlet duct 35 in communication with an orifice 36, which is controlled by the needle 37. The outer end of the orifice is controlled by a spring pressed plunger 38. The screens 39 are located in the mixing chamber 40 to effect a thorough mixing of the air and fuel. The mixing chamber 40 communicates with the intake manifold 4 through the duct 41. The flat perforated valve 42 controls the air normally drawn into mixture with the fuel.

The needle valve 37 is manually adjustable in its sleeve 43, which is raised and lowered by the rocker 44 pivotally engaged by the stem 45. This stem is spring pressed into contact with a cam 46 fast on the shaft 47 which is driven from the crank shaft 3 through the 1:1 gears 48. The stem 45 is also pivotally engaged by the rockers 49 and 50 in such manner that when the stem is raised by the cam the valve 31 is opened and the valve 42 is closed, whereas when the stem is lowered by the spring the valve 42 is opened and the valve 31 is closed.

As shown best in Figs. 6 and 7, each power cylinder 1 has a side duct 52 opening into it at 53, so as to be uncovered by the piston, near the termination of the outer stroke thereof. This duct leads to the casing of a slide valve 54, which, in its raised position, affords communication with the duct 55 leading to the intake manifold 4, and which, in its lower position, affords communication with the duct 56 leading to the exhaust manifold 5. The piston of each slide valve is raised against the spring 51 by a cam 57, which is fast on a shaft 58 driven through the gears 59 at half crank shaft speed. The arrangement is such that, just prior to the termination of the working stroke, and during the first part of the exhaust stroke of each cylinder, the valve 54 of that cylinder opens into the exhaust manifold, whereas just prior to the termination of the intake stroke and during the first part of the compression stroke of that cylinder, the same valve 54 opens into the intake manifold, thus affording a passage for the exhaust gases from each cylinder in addition to the normal passage through the main exhaust valve 7, and also affording a passage for the compressed air from the pumping mechanism into each cylinder in addition to the normal passage through the main inlet valve 6.

The operation of the parts just described is as follows: At the beginning of the working stroke of a cylinder, the compressed mixture in the cylinder may be ignited in the well known way by means of a spark plug (not shown). When the piston reaches the end of that stroke, the exhaust valve 7 is opened and the opening 53 is entirely uncovered by the piston. A considerable part of the exhaust gases then flow out through the duct 52 and that part remaining is expelled through the main exhaust valve 7 upon upward movement of the piston. The main inlet valve 6 is then opened and a mixture of air and fuel is sucked into the cylinder from the carbureter, the air being taken through the valve 42, which is held open by the rocker 50, and the fuel being taken through the orifice 36. At that time, the needle valve is depressed by the rocker 44 and the plunger 38 is raised as a result of the suction in the cylinder.

At a predetermined point of the intake stroke, shortly prior to the termination thereof, the needle valve 37 and the flat valve 42 are closed by their rockers, and shortly after that point the valve 31 is opened by its rocker. During the first part of the intake stroke of the cylinder, one of the pump pistons is driven a short way upward by its driving mechanism, but during the period in which the valve 31 is opened, the major portion of the compression stroke of that piston is completed rapidly by the cam. In this way compressed air is injected through the valve 31 and into the carbureter, which at that time has its fuel valve closed, and thence into the cylinder through the main inlet valve 6 and the supplemental valve 54 to thereby dilute the rich mixture previously sucked in and to raise the pressure of the resulting mixture at the time. Substantially at the beginning of the compression stroke of the power cylinder, the main inlet valve 6 is closed, and simultaneously therewith the valve 31 is closed and the valves 37 and 42 opened ready for supplying a charge to the next power cylinder of the engine during the intake stroke thereof. Shortly afterward, the opening at 53 is covered by the piston, thereby cutting off the duct 52 from communication with the cylinder. The compression stroke of the charged cylinder is then completed, prior to the ignition of the charge. As a result of the compressed air injected into the cylinder near the termination of the intake stroke, the resulting charge will have a comparatively high degree of compression at the end of the compression stroke.

In consequence of the pawl and ratchet mechanism and the cams, each of the pump pistons is driven intermittently, with the result that the compression strokes thereof occur for their major part when the valve 31 is open. Thus the pump compresses at that time, avoiding the subsequent expansion of highly compressed air to provide the proper degree of compression in the power cylinder near the termination of the intake stroke thereof. This results in decreased power required for driving the pumping mechanism, and decreased temperature in the compressed air.

It will now be obvious that by re-arranging the operating mechanism of the needle valve 37 so that it is open when the valve 31 is open, and closed when the valve 42 is open, air alone may be sucked into the cylinder during the first part of the intake stroke, and then a compressed mixture of air and fuel will be injected into the cylinder by the pump near the termination of the intake stroke. Or, if desired, the needle valve 37 may be partially open during the entire intake stroke, so that a mixture of fuel and air is first sucked into the cylinder and then a mixture of fuel and compressed air injected thereinto.

It will also be obvious that the number of pumps may be varied as desired, and that the several pumps may be driven simultaneously through intermittent gearing common to all of them.

The idea of injecting compressed gas, comprising fuel or air or a mixture thereof, near the termination of the intake period of each power cylinder, may be applied to a two-cycle engine as well as to one of the four-cycle type, by suitably arranging the pumping mechanism, the valves and the operating mechanism therefor.

I claim:

1. In an internal combustion engine, a power cylinder having a main inlet valve, means for drawing a charge of gas through the main inlet valve into the cylinder during the first part of the intake stroke, and pumping mechanism driven by the engine for compressing gas and thereafter injecting it into the cylinder through the main inlet valve near the termination of the intake stroke to complete the charge in the cylinder and increase the pressure therein.

2. In an internal combustion engine, a power cylinder having main and supplemental inlet valves, a piston in the cylinder for drawing gas thereinto through the main inlet valve during the first part of the intake stroke, and pumping mechanism driven by the engine for compressing gas and thereafter injecting it into the cylinder through the main and supplemental inlet valves near the termination of the intake stroke to complete the charge in the cylinder and increase the pressure therein.

3. In an internal combusion engine, a power cylinder, means including a piston for drawing a charge of gas into the cylinder during the first part of the intake stroke of the piston, an auxiliary cylinder, a piston in the auxiliary cylinder adapted to be driven by the engine, and means for supplying a charge of compressed gas from the auxiliary cylinder to the power cylinder near the termination of the intake stroke to complete the charge in the cylinder and increase the pressure therein.

4. In an internal combustion engine, a power cylinder having a main inlet valve, means including a piston for drawing a charge of gas into the cylinder through the main inlet valve during the first part of the intake stroke of the piston, an auxiliary cylinder, a piston in the auxiliary cylinder adapted to be driven by the engine, and means for supplying a charge of compressed gas from the auxiliary cylinder to the power cylinder through the main inlet valve near the termination of the intake stroke to complete the charge in the cylinder and increase the pressure therein.

5. In an internal combustion engine, a power cylinder, a carbureter, means including a piston for drawing a charge of a gas through the carbureter into the cylinder during the first part of the intake period thereof, and pumping mechanism independent of said piston driven by the engine and arranged to inject compressed gas through the carbureter into the cylinder near the termination of said intake period to complete the charge in the cylinder and increase the pressure therein at the time.

6. In an internal combustion engine, a power cylinder, a piston therein, a carbureter having a valve controlling the supply of fuel, a conduit leading from the carbureter to the inlet valve of the engine to supply gas to the cylinder during the first part of the intake stroke of the piston, pumping mechanism independent of said piston driven by the engine and arranged to inject compressed gas through the carbureter into the cylinder near the termination of said intake stroke, and operating mechanism driven by the engine and arranged to actuate the valve at timed points of the said intake stroke.

7. In an internal combustion engine, a power cylinder, a piston therein, a carbureter having a valve controlling the supply of fuel, a conduit leading from the carbureter to the inlet valve of the engine to supply gas to the cylinder during the first part of the intake stroke of the piston, pumping mechanism independent of said piston driven by the engine and arranged to inject compressed gas through the carbureter into the cylinder near the termination of said intake stroke, and operating mechanism driven by the engine and arranged to increase the size of the orifice of the valve during the first part of the said intake stroke of the piston and to decrease it when the pumping mechanism injects the compressed gas into the cylinder.

8. In an internal combustion engine, a power cylinder, a piston therein, a carbureter having a valve controlling the supply of fuel, a conduit leading from the carbureter to the inlet valve of the engine to supply gas to the cylinder during the first part of the intake stroke of the piston, pumping mechanism independent of said piston driven by the engine and arranged to inject compressed gas through the carbureter into the cylinder near the termination of said intake stroke, and operating mechanism driven by the engine and arranged to open the valve during the first part of the said intake stroke of the piston and to close it when the pumping mechanism injects compressed gas into the cylinder.

9. In an internal combustion engine, a power cylinder, a carbureter in communication with the intake duct of the engine, and pumping mechanism driven by the engine and arranged to compress and thereafter inject a charge of gas through the carbureter into the intake duct, said carbureter having a pressure valve opening to the atmosphere.

10. In an internal combustion engine, a power cylinder, a carbureter in communication with the intake duct of the engine and having fuel and air valves, pumping mechanism driven by the engine and arranged to compress and thereafter inject a charge of gas through the carbureter into the intake duct near the termination of the intake period of the cylinder, and operating mechanism driven by the engine for opening the air valve of the carbureter during the first part of the intake period and for closing that valve when the pumping mechanism injects the compressed gas through the carbureter.

11. In an internal combustion engine, a power cylinder, a carbureter in communication with the intake duct of the engine and having fuel and air valves, pumping mechanism driven by the engine and arranged to compress and thereafter inject a charge of gas through the carbureter into the intake duct near the termination of the intake period of the cylinder, and operating mechanism driven by the engine for opening said fuel and air valves during the first part of said intake period and for closing said valves when the pumping mechanism injects the compressed gas through the carbureter.

12. In an internal combustion engine, a power cylinder, means including a piston for supplying a gas to the cylinder during the first part of the intake period thereof, pumping mechanism independent of said piston driven by the engine, a chamber into which the pumping mechanism delivers compressed gas, a valve arranged between said chamber and the power cylinder, and operating mechanism driven by the engine and connected with said valve to positively open near the termination of said intake period to admit the gas compressed by said pumping mechanism into the power cylinder.

13. In an internal combustion engine, a power cylinder, means including a piston for supplying a gas to the cylinder during the first part of the intake period thereof, pumping mechanism independent of said piston driven by the engine, a chamber into which the pumping mechanism delivers compressed gas, a valve arranged between said chamber and the power cylinder, and operating mechanism connected with said valve for positively opening it, said operating mechanism being driven by the engine and arranged to hold said valve open only at the time the piston of the power cylinder is near the outer end of said intake stroke.

14. In an internal combustion engine, a power cylinder, a carbureter in communication with the power cylinder and having fuel and air valves, pumping mechanism driven by the engine, a valve arranged between the pumping mechanism and the carbureter, and operating mechanism driven by the engine and arranged to simultaneously actuate all of said valves.

15. In an internal combustion engine, a power cylinder, means including a movable working element for supplying a gas to the cylinder, pumping mechanism independent of said supplying means arranged to compress and thereafter inject a charge of gas into the cylinder, a valve arranged between the pumping mechanism and the power cylinder, and pump-operating mechanism driven by the engine and arranged to drive the pumping mechanism through a major part of its compression stroke at the time said valve is opened.

16. In an internal combustion engine, a power cylinder, a piston therein, means including a movable working element for supplying a gas to the cylinder during the first part of the intake stroke of the piston, pumping mechanism independent of said piston arranged to inject compressed gas into the cylinder during the period the piston is near the outer end of said stroke, and pump-operating mechanism driven by the engine and arranged to complete a major part of the compression stroke of the pump during said injection period.

17. In an internal combustion engine, a power cylinder, means for supplying a gas to the cylinder during the first part of the intake period thereof, pumping mechanism arranged to inject compressed gas into the cylinder in a period near the termination of said intake period, and driving mechanism for the pumping mechanism including a pawl and ratchet driven by the engine and a cam driven by the pawl and ratchet and arranged to drive the pump through a major part of its compression stroke during said injection period.

18. In an internal combustion engine, a power cylinder having main and supplemental inlet valves, means including a piston for drawing a charge of gas into the cylinder through the main inlet valve during the first part of the intake stroke of the piston, an auxiliary cylinder, a piston in the auxiliary cylinder adapted to be driven by the engine, and means for supplying a charge of compressed gas from the auxiliary cylinder to the power cylinder through the supplemental inlet valve near the termination of the intake stroke to complete the charge in the cylinder and increase the pressure therein.

19. In an internal combustion engine, a power cylinder having main and supplemental inlet valves, means including a piston for drawing a charge of gas into the cylinder through the main inlet valve during the first part of the intake stroke of the piston, an auxiliary cylinder, a piston in the auxiliary cylinder adapted to be driven by the engine, and means for supplying a charge of compressed gas from the auxiliary cylinder to the power cylinder through the main and supplemental inlet valves near the termination of the intake stroke to complete the charge in the cylinder and increase the pressure therein.

20. In an internal combustion engine, a power cylinder having main inlet and exhaust valves and a supplemental valve uncovered by the piston near the outer end of the stroke thereof, operating mechanism driven by the engine for actuating the supplemental valve to connect the power cylinder with the intake duct during the intake period of the cylinder and to connect it to the exhaust duct during the exhaust period of the cylinder, means for supplying a gas to the main inlet valve during the first part of the intake period of the cylinder, and pumping mechanism driven by the engine and arranged to inject compressed gas through the supplemental valve when it is uncovered by the piston during the intake period.

21. In an internal combustion engine, the combination of a power cylinder having an inlet valve, means including a piston for drawing a charge of gas into the cylinder through the inlet valve during the first part of the intake stroke of the piston and auxiliary pumping mechanism separate from the power cylinder and independent of the piston for supplying a charge of compressed gas to the power cylinder near the termination of the intake stroke to complete the charge in the cylinder and increase the pressure therein.

22. In an internal combustion engine, the combination of a power chamber having an inlet valve, means including a piston for drawing a charge of gas into the chamber through the inlet valve during the first part of the intake stroke of the piston, an auxiliary chamber and means associated with the auxiliary chamber for compressing gas therein and injecting it in the power chamber near the termination of the intake stroke of the piston to complete the charge in the power chamber and increase the pressure therein.

23. In an internal combustion engine, the combination of a power cylinder having a main inlet valve, means for drawing a charge of gas through the main inlet valve into the cylinder during the first part of the intake stroke and pumping mechanism for compressing gas and thereafter injecting it into the cylinder through the main inlet valve near the termination of the intake stroke to complete the charge in the cylinder and increase the pressure therein.

24. In an internal combustion engine, the combination of a power cylinder having main and supplemental inlet valves, a piston in the cylinder for drawing gas thereinto through the main inlet valve during the first part of the intake stroke, and pumping mechanism for compressing gas and thereafter injecting it into the cylinder through the main and supplemental inlet valves near the termination of the intake stroke to complete the charge in the cylinder and increase the pressure therein.

25. In an internal combustion engine, the combination of a power cylinder, a carbureter, means including a piston for drawing a charge of gas through the carbureter into the cylinder during the first part of the intake period thereof, and pumping mechanism independent of the piston for injecting compressed gas through the carbureter into the cylinder near the termination of the intake period to complete the charge in the cylinder and increase the pressure therein at the time.

26. In an internal combustion engine, the combination of a power cylinder having main inlet and exhaust ducts, valves for controlling said ducts, a supplemental valve, mechanism for actuating the supplemental valve to connect the power cylinder with the inlet duct during the intake period and connect it to the exhaust duct during the exhaust period, means for supplying a gas to the main inlet valve during the first part of the intake period, and pumping mechanism arranged to inject compressed gas into the cylinder through the supplemental valve near the termination of the intake stroke.

27. In an internal combustion engine, the combination of a cylinder having main inlet and exhaust ports, valves for controlling said ports, a power piston in the cylinder, said cylinder being provided with supplemental ports for inlet and exhaust purposes and adapted to be uncovered by the piston during the first part of the exhaust period and the latter part of the inlet period, means for supplying gas to the main inlet valve during the latter part of the intake period, and pumping mechanism for injecting compressed gas into the cylinder through the supplemental ports near the termination of the intake period.

28. In an internal combustion engine, the combination of a cylinder having main inlet and exhaust ports, valves for controlling said ports, a power piston in the cylinder, said cylinder being provided with supplemental ports for inlet and exhaust purposes and adapted to be uncovered by the piston during the first part of the exhaust period and the latter part of the inlet period, means for supplying gas to the main inlet valve during the latter part of the intake period, and pumping mechanism for injecting compressed gas into the cylinder through the main inlet valve and the supplemental ports near the termination of the intake period.

In testimony whereof I affix my signature.

LOUIS BEEH.